US007909305B2

(12) United States Patent
Helwick

(10) Patent No.: US 7,909,305 B2
(45) Date of Patent: Mar. 22, 2011

(54) SUSPENSION STRUT REMOVAL DEVICE

(75) Inventor: Bruce A. Helwick, Oklahoma City, OK (US)

(73) Assignee: The Ultimate Tool, LLC, Oklahoma City, OK (US)

( * ) Notice: Subject to any disclaimer, the term of this patent is extended or adjusted under 35 U.S.C. 154(b) by 468 days.

(21) Appl. No.: 12/080,491

(22) Filed: Apr. 4, 2008

(65) Prior Publication Data

US 2008/0277634 A1 Nov. 13, 2008

Related U.S. Application Data

(63) Continuation-in-part of application No. 11/800,766, filed on May 8, 2007, now abandoned.

(51) Int. Cl.
*B60P 1/48* (2006.01)

(52) U.S. Cl. .................................................... 254/10.5

(58) Field of Classification Search .................. 254/10.5
See application file for complete search history.

(56) References Cited

U.S. PATENT DOCUMENTS

| | | | | |
|---|---|---|---|---|
| 2,883,742 | A * | 4/1959 | Prath | 254/10.5 |
| 3,982,730 | A * | 9/1976 | Otsuka | 254/10.5 |
| D259,538 | S | 6/1981 | Bowling | |
| 4,276,684 | A | 7/1981 | Mattson | |
| 4,516,303 | A | 5/1985 | Kloster | |
| 4,541,614 | A | 9/1985 | Klann | |
| 4,809,951 | A * | 3/1989 | Klann | 254/10.5 |
| 4,872,644 | A | 10/1989 | Papapetros | |
| 4,909,480 | A | 3/1990 | Mattson | |
| 4,976,416 | A | 12/1990 | Klann | |
| 5,172,889 | A | 12/1992 | Post | |
| 5,680,686 | A | 10/1997 | Bosche | |
| 6,129,339 | A | 10/2000 | Lundgreen | |
| 6,616,126 | B1 | 9/2003 | Barrios | |

* cited by examiner

*Primary Examiner* — Joseph J Hail, III
*Assistant Examiner* — Shantese McDonald
(74) *Attorney, Agent, or Firm* — Beaumont Gitlin Tashjian; Larry F. Gitlin

(57) ABSTRACT

A device for compressing a coiled spring comprised of multiple coils used in combination with a motor vehicle suspension strut under tension including a first hollow tube and a second smaller tube adapted to fit slidably into the first hollow tube. First and second compressor plates are provided to engage spaced coils. A rotatable drive shaft compresses the coiled spring to reduce tension against the strut's retention end plates to enable the safe, quick and easy removal and replacement of the strut. Each compressor plate consists of an open ended slotted central portion and two side sections defining an upper slotted section and a narrower bottom slotted section with an annular interior edge. The upper slotted section is provided to seat coils with a large diameter. The bottom slotted section is provided to seat coils with a small diameter.

Openings are formed within the plates' side sections to receive elongated rods for preventing the tensioned coiled spring from slipping from its placement while awaiting the installation of a new strut.

12 Claims, 8 Drawing Sheets

SUSPENSION STRUT REMOVAL DEVICE

This is a continuation-in-part of application Ser. No. 11/800,766 filed May 8, 2007, now abandoned.

BACKGROUND OF THE INVENTION

1. Field of the Invention

The present invention relates generally to the field of motor vehicles, and more particularly, to a device used to facilitate the removal and replacement of a suspension strut in a suspension strut assembly by employing means to compress the coiled springs of different sizes to release the tension of the coiled spring against the strut and enable the strut to be safely removed and replaced.

2. Description of the Prior Art

A preliminary patentability and novelty search conducted for the present invention found U.S. Pat. Nos. 3,982,730; D259,538; 4,541,614; 4,872,644; and, 4,516,303, which disclose the following:

1. U.S. Pat. No. 3,982,730. This reference is directed to a manually crank strut spring compressor. This compressor has an elongate hollow housing that receives a threaded rod member that is rotatably supported at each end of the housing and driven by a bevel gear arrangement. A pair of spring engaging plates are U-shaped with a large notch adapted to fit over the shaft of the strut. The U-shaped claws are angled to correspond to the slope of the strut's coil spring. One of the spring engaging plates is fixed to the housing and the other is fixed to a threaded block that rides on the threaded rod and slides within the body of the compressor.

2. U.S. Pat. No. D259,538. This reference is directed to the ornamental design for a spring compressing tool, as shown in FIGS. 1-4. The compressor has a hand crank and apparently a bevel gear arrangement to drive a threaded rod. One plate is fixed to the tubular body and the other plate apparently is driven by a threaded block. The spring engaging plates are angled to correspond to the slope of the spring being compressed.

3. U.S. Pat. No. 4,541,614. This reference is directed to a coil spring compressor that has a pair of clamping jaws that are generally horseshoe shaped and angled to be in conformity with the slope of the coil springs being compressed. One of the clamping jaws is fastened to the guiding tube and the other is fastened to a collar that engages a slide ring inside the guide tube that engages the threaded rod. The threaded rod has a hexagonal head provided on its lower end to be engaged by a driving means, such as a wrench.

4. U.S. Pat. No. 4,872,644. This reference is directed to a tool for compressing the coil spring of motor vehicle suspension struts. The body of the tool is a rack made from a hollow channel having bearings at either end to support a threaded bar. A block sized to be a close fit for the inside of the hollow channel has a threaded aperture to engage the threaded bar. A pair of spring engaging members in the form of angled arms is provided. One pair of arms is welded to one end of the hollow channel and another pair of arms is fitted to the block that rides inside the channel. Mounted on each of the arms are cleats shaped to insert between the grip of the coils of a spring. The threaded rod has a hand crank.

5. U.S. Pat. No. 4,516,303. This reference is directed to a spring compressor that can be utilized for compressing coil springs on strut suspension assemblies. The spring compressor has a pair of threaded guide shafts that are secured in a parallel arrangement between a top support and bottom support. Mounted on the pair of guide shafts is a gear drive assembly adapted to move along the threaded supports when its input shaft is rotated. A pair of spring engaging shoes are provided, one being secured to the top support and the other being secured to the gear drive assembly.

Also pertinent to the art are U.S. Pat. Nos. 4,276,684; 4,909,480; 4,976,416; 5,172,889; 5,680,686; 6,129,339; and 6,616,126 B1.

An examination of the aforesaid patents discloses that the respective teachings are different in material respects from the structure and function of the present invention. In particular, but by no means the only difference between these other devices and the device of the present invention, is the unique ability of the structure of the present invention to accommodate strut coiled springs comprised of coils with different diameters.

Devices of all kinds have been used in the prior art to facilitate the safe removal of a motor vehicle suspension strut. Many of these devices, including those described in some of the above-cited references, are crude, clumsy, inefficient and/or extremely unsafe to use. Where a particular device may seem safe and effective, it generally lacks the element of portability or ease of use. Further, none of these devices provides the means to accommodate a suspension strut with coils of different sizes. For example, it is common knowledge in the automobile industry that the coils used with suspension struts for domestic vehicles are usually larger than the coils used with suspension struts for some, if not most, import models. Thus, what the prior art is lacking is a device that is easily portable, easy to operate and functions at a high degree of effectiveness to enable the user to achieve the intended objective, namely to safely remove a strut from the suspension strut assembly and maintain the compressed or tensioned coil spring safely in place while a replacement strut is installed. In addition, the prior art lacks a device that can accommodate suspension struts with coils having different diameters.

Accordingly, nothing in the prior art provides the device that is as capable, versatile, portable and accommodating as the device of the present invention, as taught in detail in the specification and defined in the appended claims.

SUMMARY OF THE INVENTION

The present invention provides a device for compressing a coiled spring comprised of multiple coils used in combination with a motor vehicle suspension strut under tension from the coiled spring. The device includes a first hollow tube having a certain diameter, and a first end and a second end. A second tube, which may also be entirely or partially hollow, is included and has a diameter that is smaller than the diameter of the first hollow tube with the second tube being adapted to fit slidably into the first hollow tube. The second tube also has a first end and a second end with a threaded section formed at or along the interior side walls of the first end. Also provided is a rotatable threaded drive shaft, which is coaxially mounted within the first hollow tube at one end of the tube, for engaging the threaded section. A first compressor plate is attached to the first hollow tube to engage one of the coils of the coiled spring and a second compressor plate is attached to the second tube to engage a second such coil. A means is provided to drive the rotatable threaded drive shaft. The drive shaft is employed to compress the coiled spring for the purpose of reducing the tension of the coiled spring against the strut's retention end plates to enable the safe, quick and easy removal and replacement of the strut with a new one.

In one embodiment of the present invention, each of the two compressor plates consists of an open ended slotted central portion defined by two side sections. In another embodiment of the present invention, the side sections of each of the two compressor plates define an upper slotted section and a narrower bottom slotted section with an annular interior edge. The upper slotted section is provided to engage and seat coils of a certain relatively large diameter, while the bottom slotted section is provided to engage and seat coils of a relatively small diameter. An opening, which is defined where the sides of the upper and bottom slotted sections converge, is provided to enable coils with relatively smaller diameters to pass through the opening into the bottom slotted section where it is received and seated.

Openings are formed within the side sections of each of the compressor plates to receive elongated rods utilized to prevent personal injury and damage to property by keeping the tensioned coiled spring from slipping from its placement while the suspension strut is being removed and awaits the installation of a substitute.

A handle and a drive gear assembly are mounted at one end of the rotatable drive shaft to impose rotation and axial movement to the shaft causing it to engage and rotate through the threaded section in diametrically opposed directions to either compress or decompress the coiled spring, as the operator desires.

Accordingly, it is the object of the present invention to provide a device for compressing a tensioned coiled spring with multiple coils used in combination with a motor vehicle suspension strut.

Another object of the present invention is to provide a device for compressing a tensioned coiled spring with multiple coils used in combination with a motor vehicle suspension strut that can accommodate coils having different diameters.

Another object of the present invention is to provide a device for compressing a tensioned coiled spring with multiple coils used in combination with a motor vehicle suspension strut that is easily portable.

Another object of the present invention is to provide a device for compressing a tensioned coiled spring with multiple coils used in combination with a motor vehicle suspension strut that is effective, safe and easy to use.

Still another object of the present invention is to provide a device for compressing a tensioned coiled spring with multiple coils used in combination with a motor vehicle suspension strut that is easy and cost effective to manufacture.

Other objects and advantages of the present invention will become apparent in the following specifications when considered in light of the attached drawings wherein the preferred and another embodiment of the invention is illustrated.

DETAILED DESCRIPTION OF THE PREFERRED EMBODIMENT

Figure 1:
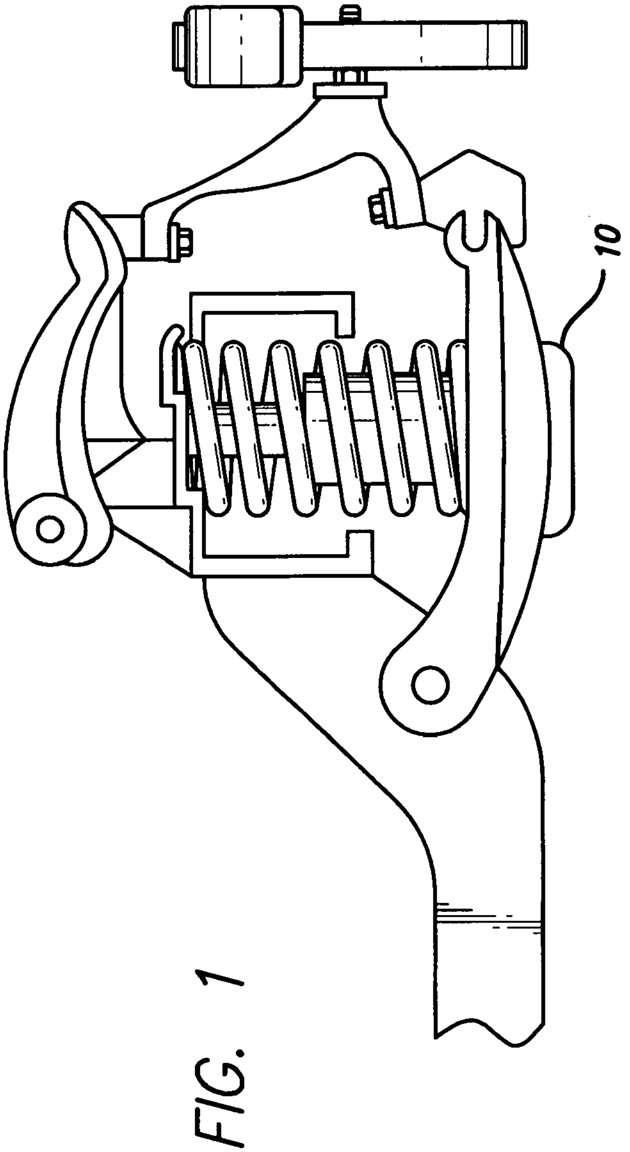
FIG. 1 is a side elevational view of a suspension strut assembly installed in a motor vehicle.

FIG. 1 illustrates a conventional suspension strut assembly 10 installed in a section of a motor vehicle (not shown).

Figure 2:
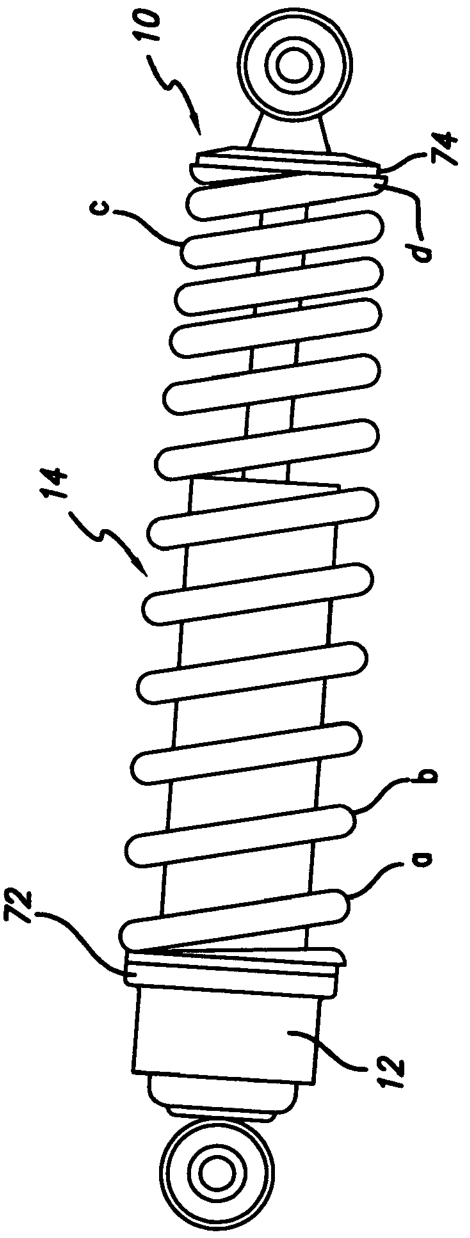
FIG. 2 is a perspective view of a suspension strut assembly.

FIG. 2 illustrates the uninstalled version of strut assembly 10, which comprises strut 12 and coiled spring 14. Coiled spring 14 is comprised of individual coils, including, among others, individual coils a, b, c and d.

Figure 3A:
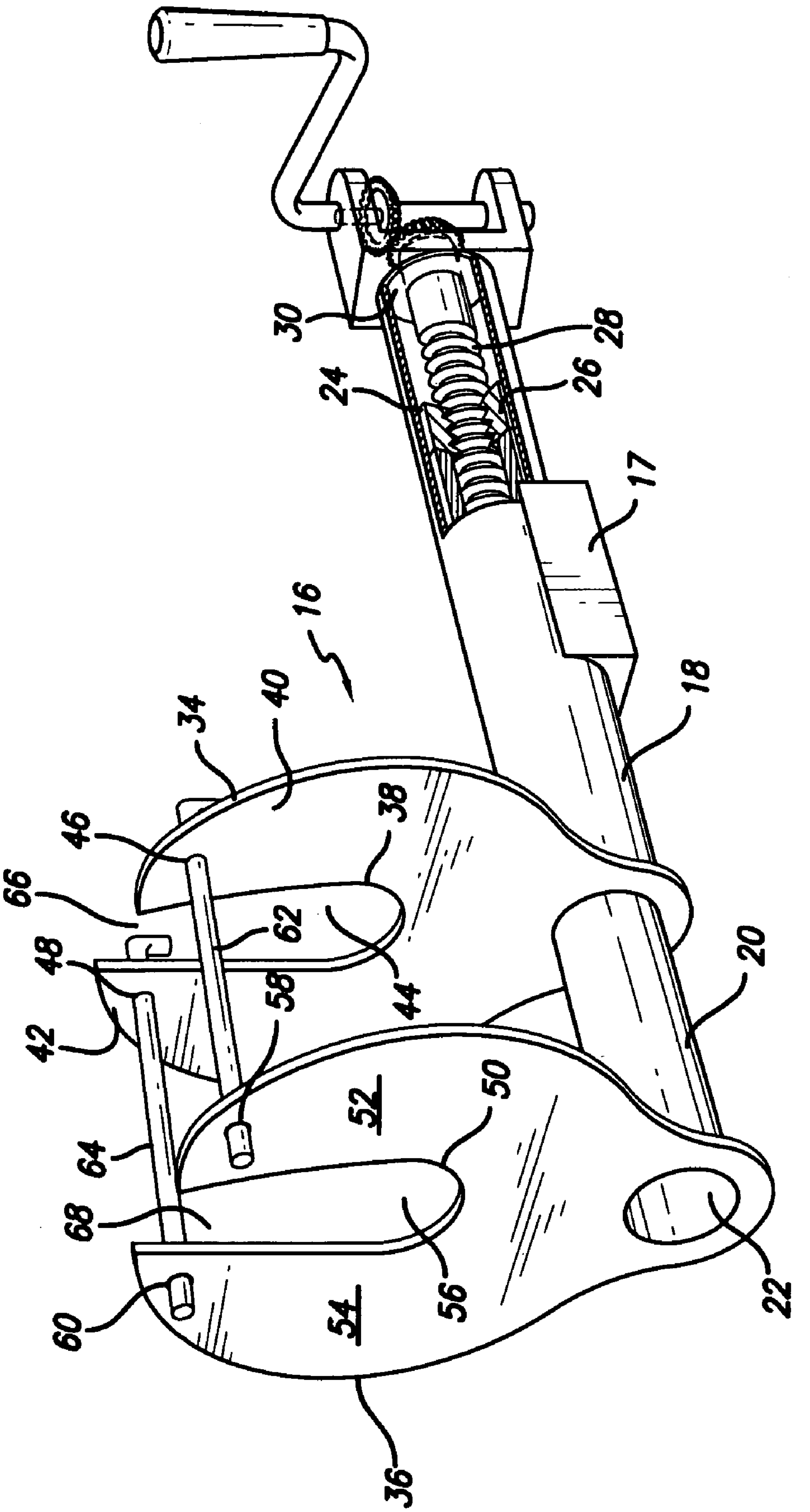
FIG. 3A is a perspective view of one embodiment of the device of the present invention.
Figure 3B:
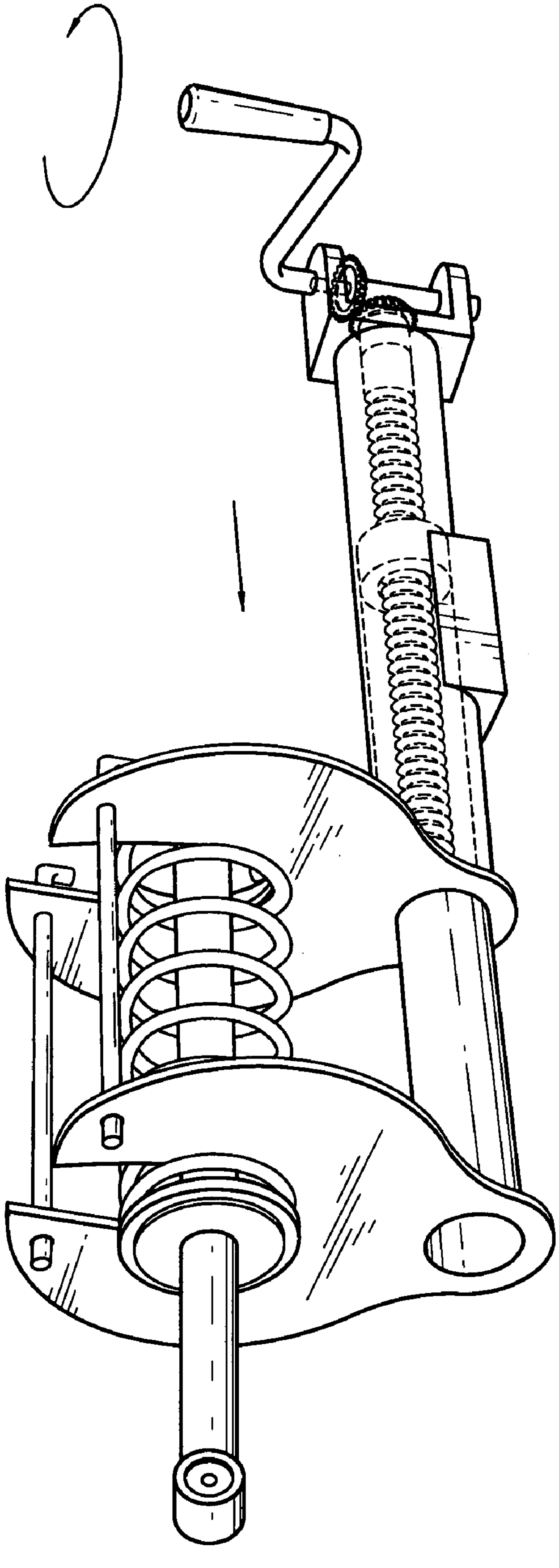
FIG. 3B is a perspective view of the same embodiment of the device of the present invention shown immediately before compression the coiled spring relieves tension against the retention end plates of the strut.

FIGS. 3A and 3B illustrate one preferred embodiment of suspension strut removal device 16 of the present invention. Device 16 comprises hollow tube 18 and tube 20 with a diameter smaller than the diameter of tube 18 to enable tube 20 to fit slidably into hollow tube 18. Tube 20 has a first end 22 and a second end 24 with threaded nut 26. Alternatively, tube 20 may be hollow throughout or, at least, include a hollow section at one end with a threaded interior wall (not shown). Rotatable threaded drive shaft 28 is coaxially mounted within hollow tube 18 at end 30 and is adapted to engage threaded nut 26 or the threaded interior wall (not shown) of tube 20. Compressor plate 34 is attached to hollow tube 18 to engage a single coil of coil spring 14, such as coil c or d. Compressor plate 36 is attached to tube 20 to engage a single coil of coil spring 14, such as coil a or b. Compressor plate 34 comprises central portion 38 and side sections 40 and 42, which are laterally offset from one another with each section having a pre-determined slope to conform to the slope of the individual coil it engages. Slotted opening 44 is formed through central portion 38. Openings 46 and 48 are formed in side sections 40 and 42, respectively. Compressor plate 36 comprises central portion 50 and side sections 52 and 54, which are laterally offset from one another with each section having a pre-determined slope to conform to the slope of the coil it engages. Slotted opening 56 is formed through central portion 50. Openings 58 and 60 are formed in side sections 52 and 54, respectively. Openings 46, 48, 58 and 60 are provided to receive elongated rods 62 and 64 through aligned openings 46 and 58, and 48 and 60, respectively. Rods 62 and 64 are provided to keep coiled spring 14 from slipping or bursting from its placement and possibly causing personal injury or property damage while spring 14 awaits the installation of a new strut.

In the application of this embodiment of the present invention, suspension strut removal device 16 is positioned so that openings 66 and 68 of slotted openings 44 and 56, respectively, are oriented upwardly. A mounting plate 17 is provided for use with a table mounted vice (not shown). Compressor plate 34 then engages either coil c or d, and compressor plate 36 engages either coil a or b, offered here only as a hypothetical. The slopes of side sections 40, 42, 52 and 54 conform to the individual slopes of the coils seated in slotted openings 44 and 56.

Figure 4B:
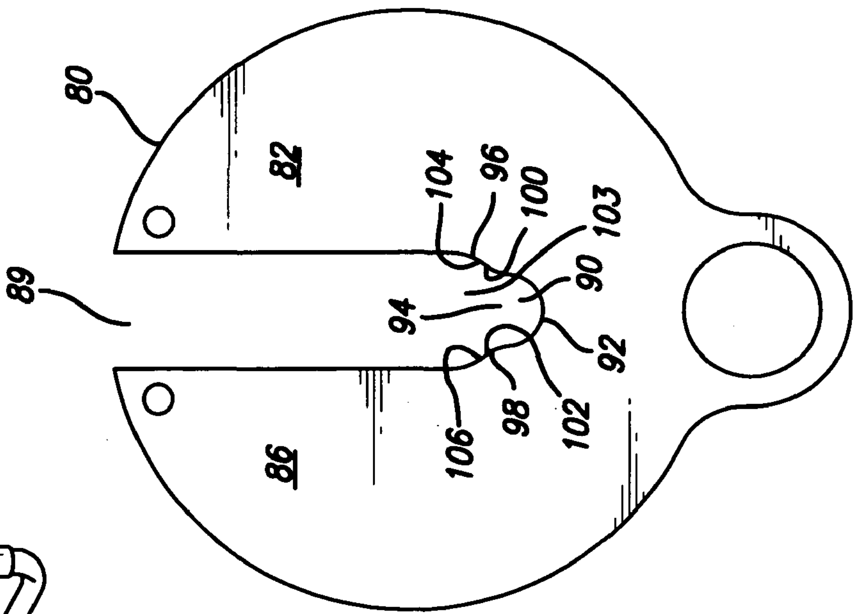
FIG. 4B is a front perspective view of a compressor plate used with the more preferred embodiment of the present invention shown in FIG. 4A.
Figure 4A:
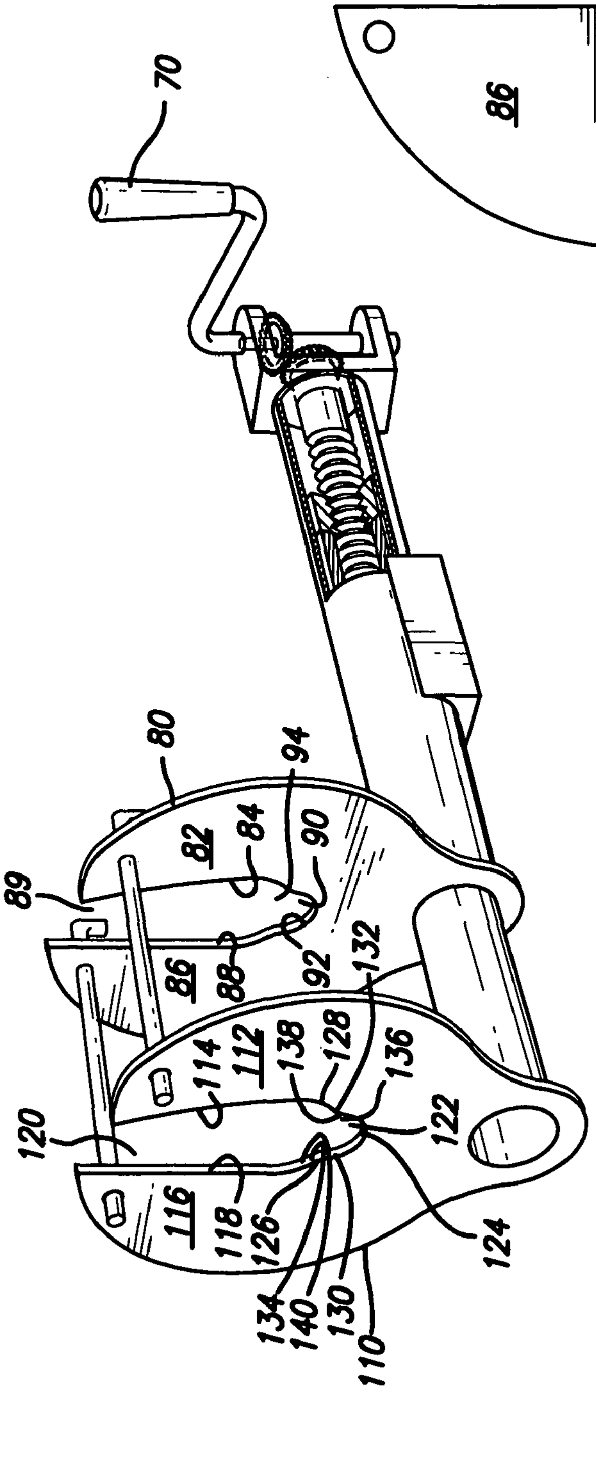
FIG. 4A is a perspective view of a more preferred embodiment of the device of the present invention.

In another preferred embodiment of the present invention shown in FIGS. 4A and 4B, first compressor plate 80 comprises first side section 82 with interior edge 84 and second side section 86 with interior edge 88. First and second side sections 82 and 86 define a vertically extending open ended first slot 89 with integral bottom section 90 having annular interior edge 92, which defines second slotted opening 94. Second slotted opening 94 gradually expands outwardly as opposing sides 96 and 98 diverge to form first shoulder section 100 and second shoulder section 102, respectively. Opening 103 is formed between the points where opposing sides 96 and 98 begin to diverge. First and second shoulder sections 100 and 102 define seating surfaces 104 and 106, respectively, adapted to engage and support coils c, d, etc. having a pre-determined relatively large diameter.

In the same embodiment, second compressor plate 110 is also provided. Plate 110 comprises, respectively, first side section 112 with interior edge 114 and second side section 116 with interior edge 118. First and second side sections 112 and 116 define a vertically extending open ended first slot 120 with integral bottom section 122 having annular interior edge 124, which defines second slotted opening 126. Second slotted opening 126 gradually expands outwardly as opposing sides 128 and 130 diverge to form first shoulder section 132 and second shoulder section 134, respectively. Opening 136 is formed between the points where opposing sides 128 and 130 diverge. First and second shoulder sections 132 and 134 define seating surfaces 138 and 140, respectively, adapted to engage and support coils a, b, etc. having a pre-determined relatively small diameter.

Using first compressor plate 80 as an example, with first slot 89 having a width of approximately 7", a coil having a diameter of between 5" and 7" would have the capability of sliding easily into first slot 89 eventually coming to rest and seating itself securely upon seating surfaces 104 and 106. If the coil is smaller in diameter, smaller in fact than the width of opening 103, which is typical of the coils used in suspension struts for foreign automobiles, the coil could then easily fit through opening 103 passing through the opening and eventually coming to rest and seating itself securely upon annular interior edge 92.

Handle 70 and drive gear assembly 72 are mounted at end 30 of hollow tube 18 to impose rotation to drive shaft 28 and urge drive shaft 28 to engage and rotate through threaded nut 26 in diametrically opposed directions to either compress or decompress coil spring 14, as desired.

Figure 5:
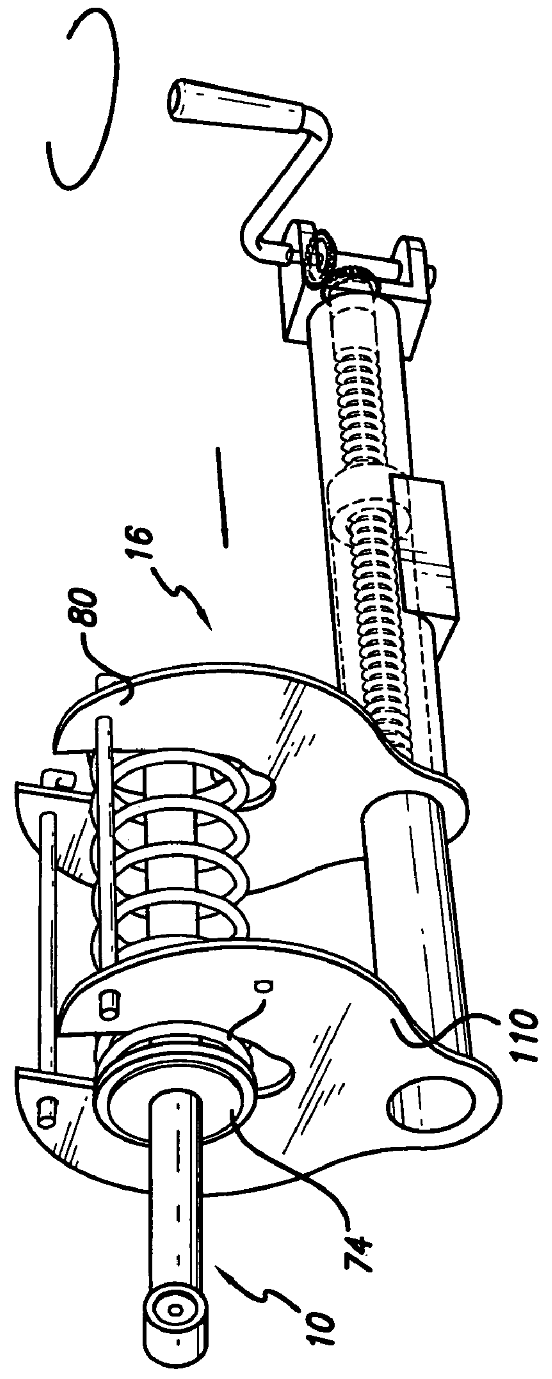
FIG. 5 is a perspective view of the more preferred embodiment of the device of the present invention shown immediately before compression of the coiled spring relieves tension against the retention end plates of the strut.
Figure 6:
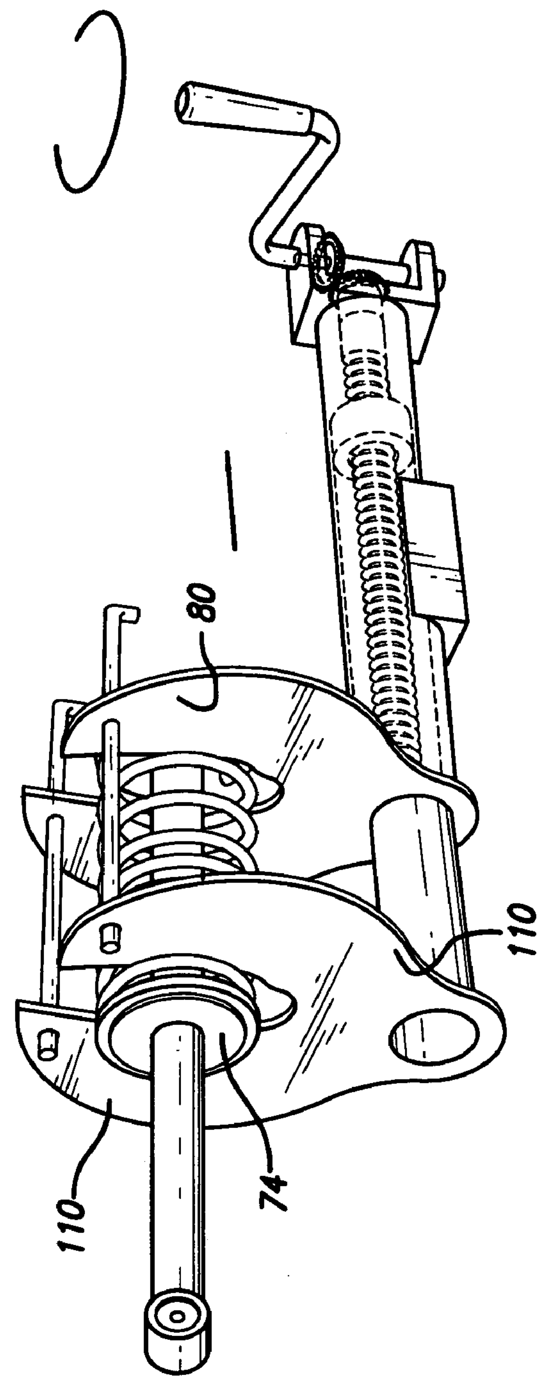
FIG. 6 is a perspective view of the more preferred embodiment of the device of the present invention shown with the coiled spring compressed just prior to the removal of the strut.
Figure 7:
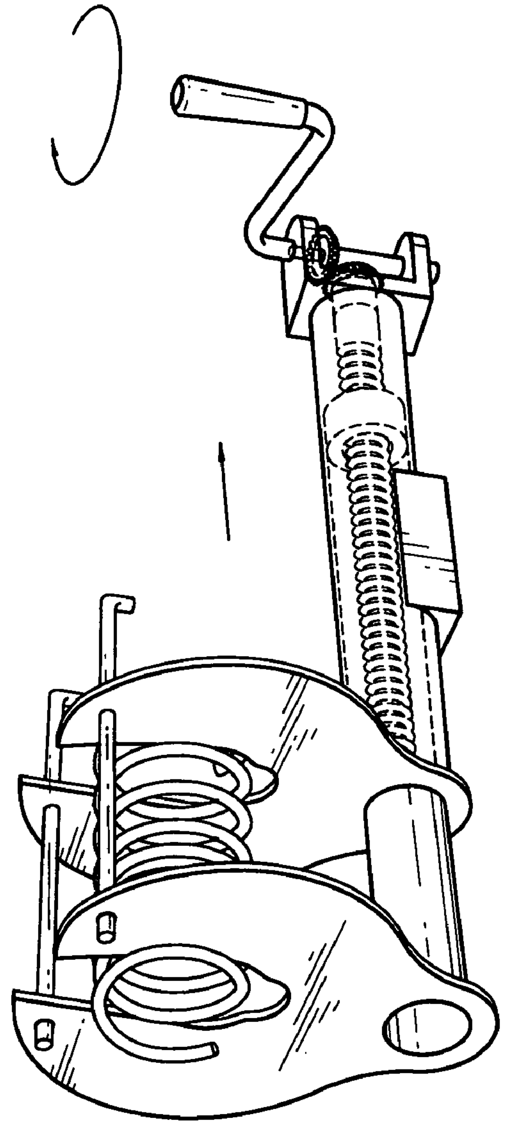
FIG. 7 is a perspective view of the more preferred embodiment of the device of the present invention shown with the coiled spring compressed and the strut removed.
Figure 8:
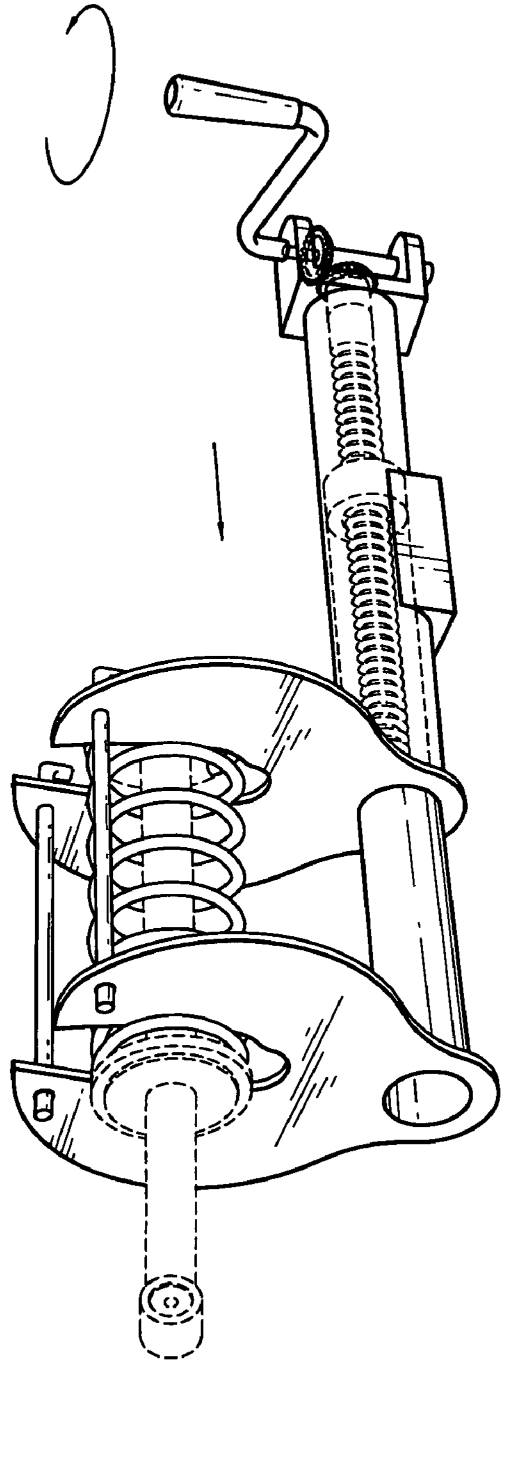
FIG. 8 is a perspective view of the more preferred embodiment of the device of the present invention shown with the new strut installed and the decompressed coiled spring tensioning against the strut's retention end plates after installation.
Figure 9:
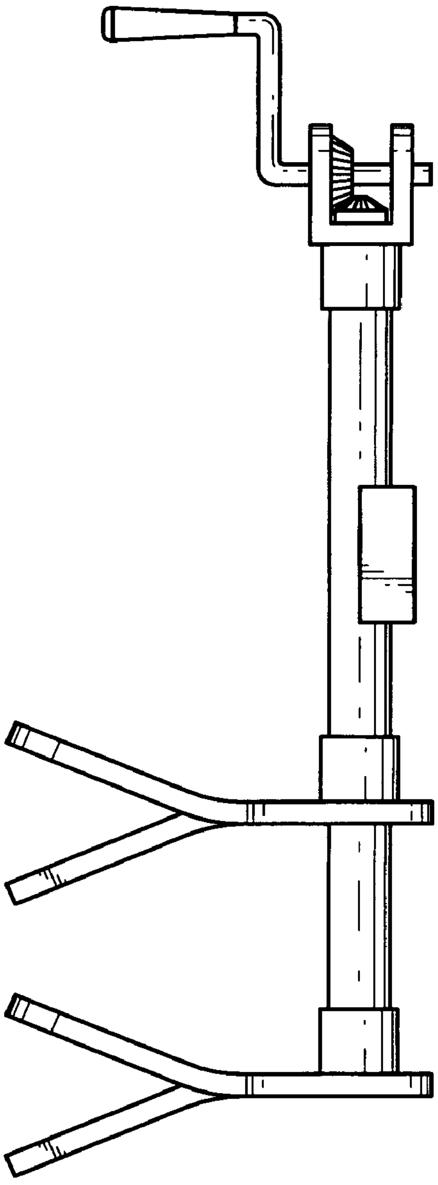
FIG. 9 is a side perspective view of the device of the present invention with the compressor plates shown with their side sections offset to accommodate the slopes of the coils.
Figure 10:
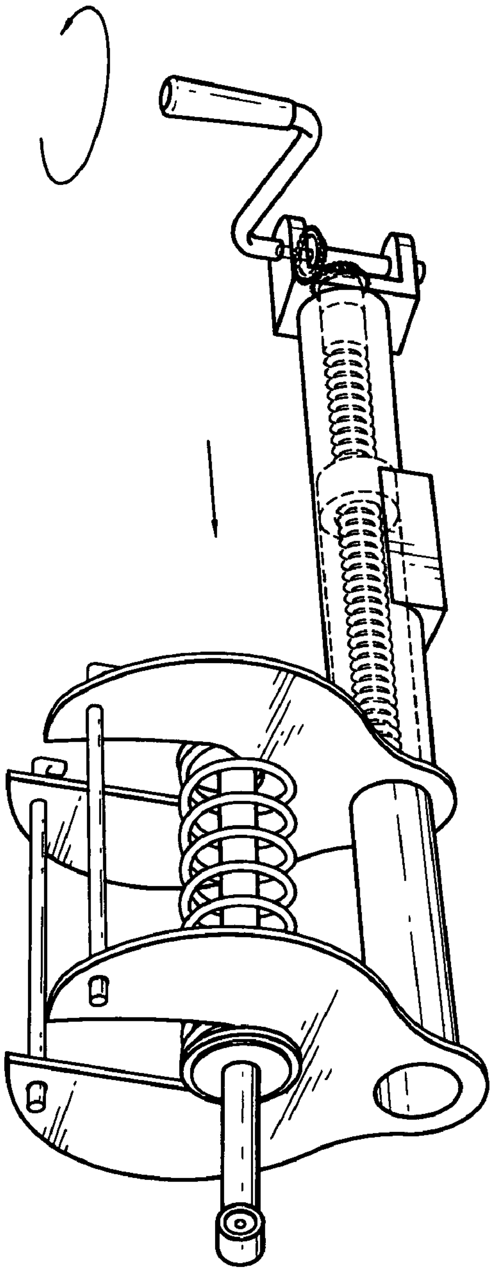
FIG. 10 is a perspective view of the embodiment of the device of the present invention shown in FIGS. 4A through 8 in combination with a suspension strut having a coiled spring with coils of a relatively smaller diameter.
Figure 11:
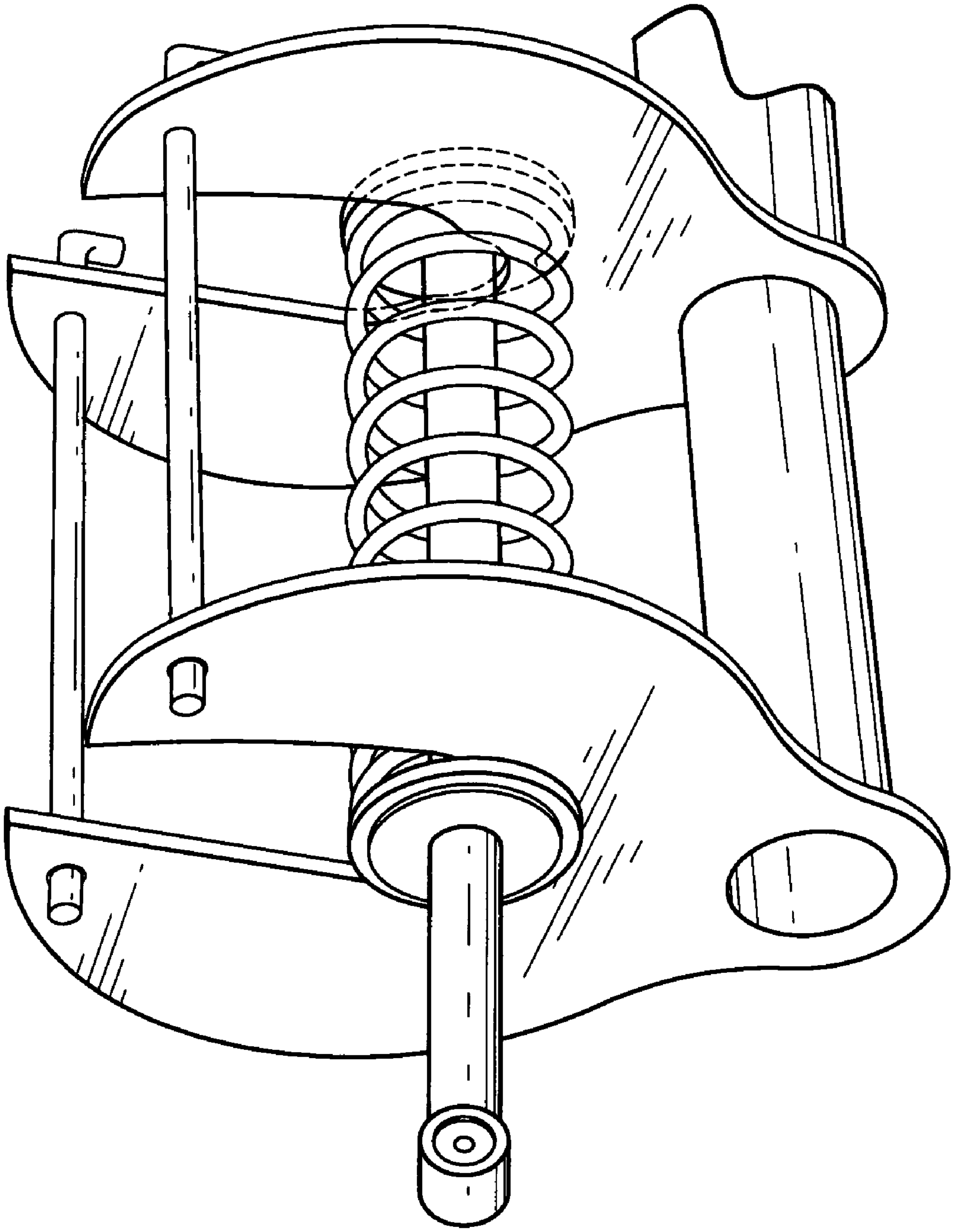
FIG. 11 is an enlarged perspective of the device and suspension strut shown in FIG. 10.

Thus, as shown in FIG. 5, device 16 engages strut assembly 10 by first turning handle 70, which rotates drive shaft 28 to adjust the positions of compressor plates 80 and 110 (or compressor plates 34 and 36) to enable them to engage the individual coils. In FIG. 6, handle 70 is then rotated to draw compressor plates 80 and 110 (or 34 and 36) towards each other to compress coiled spring 14. This action removes the tension from coiled spring 14 against retention end plates 72 and 74. With the elimination of this tension, strut 12 can be safely and easily removed from device 16 (FIG. 7). A new strut then can be installed in its place (FIG. 8).

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

The invention claimed is:

1. A device for compressing a coiled spring with multiple coils used in combination with a motor vehicle suspension strut having retention end plates under tension from said coiled spring, comprising a first hollow tube having a certain diameter and a first end and a second end;

a second tube having a diameter smaller than the diameter of said first hollow tube, a portion of said second tube being adapted to fit slidably into and out of said first hollow tube, said second tube having a first end, a second end and a threaded section;

a rotatable threaded drive shaft for engaging said threaded section, said rotatable drive shaft being coaxially mounted within said first hollow tube at said first end of said first hollow tube;

a first means attached to said first hollow tube to engage a first coil of said coiled spring;

a second means attached to said second tube to engage a second coil of said coiled spring; and a means to drive said rotatable threaded drive shaft to compress said coiled spring to release the tension of said coiled spring against said retention end plates of said strut to enable the removal and replacement of said strut.

2. A device for compressing a coiled spring with multiple coils used in combination with a motor vehicle suspension strut having retention end plates under tension from said coiled spring, comprising a first hollow tube having a certain diameter and a first end and a second end;

a second tube having a diameter smaller than the diameter of said first hollow tube being adapted to fit slidably into said first hollow tube, said second tube having a first end, a second end and a threaded section;

a rotatable threaded drive shaft for engaging said threaded section, said rotatable drive shaft being coaxially mounted within said first hollow tube at said first end of said first hollow tube;

a first compressor plate attached to said first hollow tube to engage and secure individual said coils of varying diameters, said first compressor plate having a first side section with an interior edge and a second side section with an interior edge, said first and second side sections defining a vertically extending open ended first slot and an integral bottom section having an annular interior edge defining a second slotted opening, with said annular interior edge gradually diverging outwardly on opposing sides to form first and second shoulder sections, each of said shoulder sections having a seating surface being adapted to engage and support coils having a first diameter and said annular interior edge of said bottom section being adapted as an annular seating surface for a coil with a diameter smaller than said first diameter to enable said smaller coil to pass through said second slotted opening and be received there in seating engagement upon said annular seating surface, said first and second side sections being laterally offset to form a slope conformable to said slope of said coils;

a second compressor plate attached to said first hollow tube to engage and secure individual said coils of varying diameters, said first compressor plate having a first side section with an interior edge and a second side section with an interior edge, said first and second side sections defining a vertically extending open ended first slot and an integral bottom section having an annular interior edge defining a second slotted opening, with said annular interior edge gradually diverging outwardly on opposing sides to form first and second shoulder sections, each of said shoulder sections having a seating surface being adapted to engage and support coils having a first diameter and said annular interior edge of said bottom section being adapted as an annular seating surface for a coil with a diameter smaller than said first diameter to enable said smaller coil to pass through said second slotted opening and be received there in seating engagement upon said annular seating surface, said first and second side sections being laterally offset to form a slope conformable to said slope of said coils;

a means to drive said rotatable threaded drive shaft to compress said coiled spring to release the tension of said coiled spring against said retention end plates of said strut to enable the removal and replacement of said strut.

3. The suspension strut compression device of claim 2 wherein said threaded section comprises a threaded nut.

4. The suspension strut compression device of claim 2 wherein said first side section of said first compressor plate defines a first opening and said second side section of said first compressor plate defines a second opening.

5. The suspension strut compression device of claim 4 wherein said first side section of said second compressor plate defines a first opening in general alignment with said first opening in said first side section of said first compressor plate and said second side section of said second compressor plate defines a second opening in general alignment with said second opening in said second side section of said first compressor plate.

6. The suspension strut compression device of claim 5 comprising a first pin member and a second pin member for engaging said aligned first and second openings in said first compressor plate and said second compressor plate.

7. The suspension strut compression device of claim 2 wherein said means to drive said threaded drive shaft comprises a drive gear assembly and a handle means to impose rotatable movement to said drive gear assembly to rotate and move said threaded drive shaft through said threaded section in diametrically opposed directions to either compress or decompress said coiled spring.

8. The suspension strut compression device of claim 2 comprising a mounting member for supporting said device in a bench vise.

9. The device suspension strut compression of claim 2 wherein said first means to engage said first coil of said coiled spring and said second means to engage said second coil of said coiled spring are spaced apart.

10. The suspension strut compression device of claim 2 wherein said means to drive said rotatable threaded drive shaft compresses a section of said coiled spring situated between said first coil and said second coil.

11. The suspension strut compression device of claim 2 wherein said second tube is hollow.

12. The suspension strut compression device of claim 11 wherein said threaded section comprises a threaded interior wall formed within said hollow portion of said second tube.

* * * * *